United States Patent [19]
Griswold et al.

[11] 4,333,495
[45] Jun. 8, 1982

[54] CHECK VALVE ASSEMBLY

[75] Inventors: David E. Griswold, Corona Del Mar; Richard E. Veit, Morro Bay, both of Calif.

[73] Assignee: Griswold Controls, Irvine, Calif.

[21] Appl. No.: 183,583

[22] Filed: Sep. 2, 1980

Related U.S. Application Data

[60] Division of Ser. No. 10,987, Feb. 9, 1979, Pat. No. 4,244,395, which is a continuation-in-part of Ser. No. 410,173, Oct. 26, 1973, abandoned.

[51] Int. Cl.³ .............................................. F16K 15/02
[52] U.S. Cl. .................................. 137/484.2; 137/218; 137/512; 137/614.2; 137/540
[58] Field of Search ...................... 137/218, 484.2, 512, 137/540, 614.2

[56] References Cited
U.S. PATENT DOCUMENTS

| | | | |
|---|---|---|---|
| 1,029,464 | 6/1912 | Ruwell | 137/512 X |
| 1,147,343 | 7/1915 | Smolensky | 137/512 |
| 2,707,485 | 5/1955 | Saalfrank | 137/512 |
| 3,438,391 | 4/1969 | Yocum | 137/540 X |
| 4,231,387 | 11/1980 | Dixon | 137/218 |

*Primary Examiner*—Harold W. Weakley
*Attorney, Agent, or Firm*—Lyon & Lyon

[57] ABSTRACT

A check valve assembly employs a poppet slidably mounted in a stationary barrel to engage a seat in the barrel. The poppet and barrel cooperate to form a closed chamber containing a spring which acts to close the poppet against the seat, but the force of the spring is partially overcome by a reduction in pressure in the chamber caused by venturi action by forward flow through the check valve assembly with the result that higher upstream pressure is needed to open the valve than to maintain it in open position, at least for low and medium flow rates. Two identical check valve assemblies are connected in series, the assemblies being perpendicular to each other, each mounted at about a 45° angle with respect to coaxial inlet and outlet terminals.

2 Claims, 5 Drawing Figures

FIG. 1.
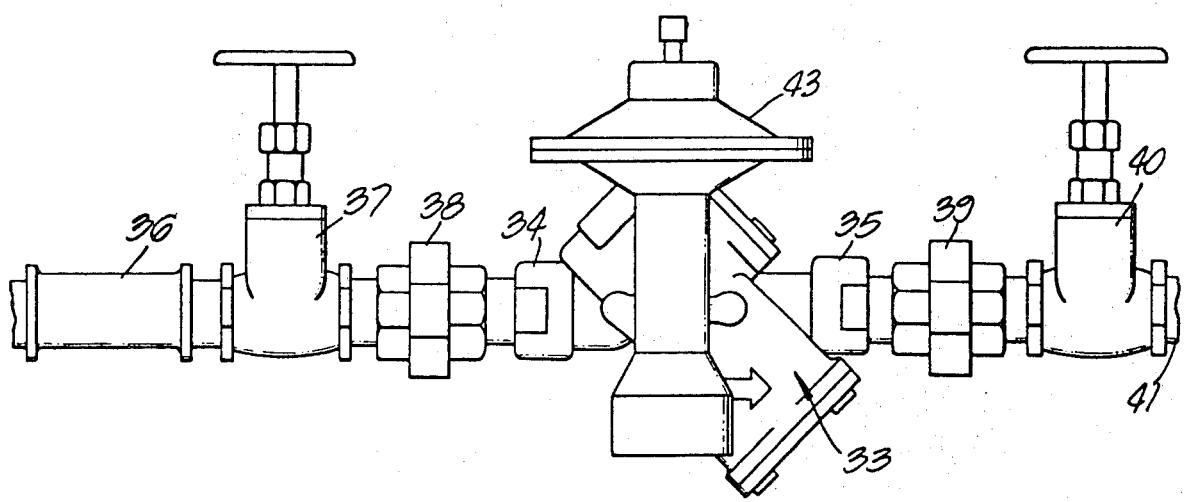
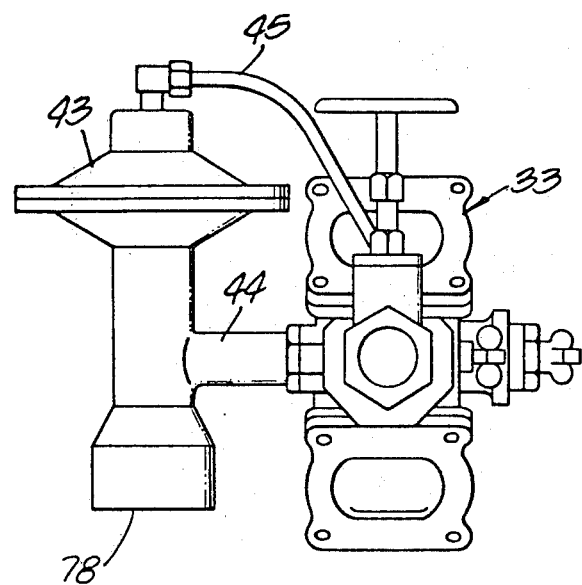
FIG. 2.

CHECK VALVE ASSEMBLY

This application is a division of Ser. No. 10,987 filed Feb. 9, 1979, entitled "Check Valve Assembly", now U.S. Pat. No. 4,244,395, which is a continuation-in-part of application Ser. No. 410,173 filed Oct. 26, 1973 and entitled "Backflow Prevention Apparatus", now abandoned.

This invention relates to fluid flow apparatus and is particularly directed to improvements in check valve construction.

Check valves are commonly provided when it is desired to permit fluid flow in one direction but to prevent fluid flow in the other direction. A single check valve acting alone may leak slightly and, therefore, single check valves are not used when it is necessary to prevent any reverse flow, even in the smallest degree. In the latter situation, backflow prevention apparatus may take the form of two check valves connected in series with a "zone" between them. Both check valves remain open during normal flow in a forward direction, but in the event that the downstream pressure should approach the upstream pressure within a predetermined amount, for example, two pounds per square inch, the volume of the zone between the check valves is vented to atmosphere. In such devices, downstream pressure can never exceed upstream pressure, even under vacuum conditions, with the result that reverse flow is not possible.

Backflow prevention devices of the type just described have at least two serious shortcomings. The first is that, in order to have a check valve which will close satisfactorily, and more significantly, in certain cases, maintain a predetermined minimum pressure, a spring force is used, and this must be overcome during normal flow in the forward direction. Unfortunately, this often results in a pressure drop of serious proportions, particularly when two check valves in series are employed. Another difficulty is that conventional apparatus for venting the zone between the check valves is usually costly, inaccurate and difficult to maintain.

Accordingly, it is the principal objective of this invention to provide check valves suitable for use in backflow prevention equipment and that are constructed to both provide a relatively high initial resistance to pressure and flow and yet as the demand for flow increases, cause the corresponding pressure drop to be at a minimum value.

Other and more detailed objects and advantages will appear hereinafter.

In the drawings:

FIG. 1 is a side elevation of a complete backflow preventer assembly employing check valves embodying this invention.

FIG. 2 is an end elevation of the device shown in FIG. 1.

FIG. 3 shows a preferred embodiment of this invention.

Figure 4:
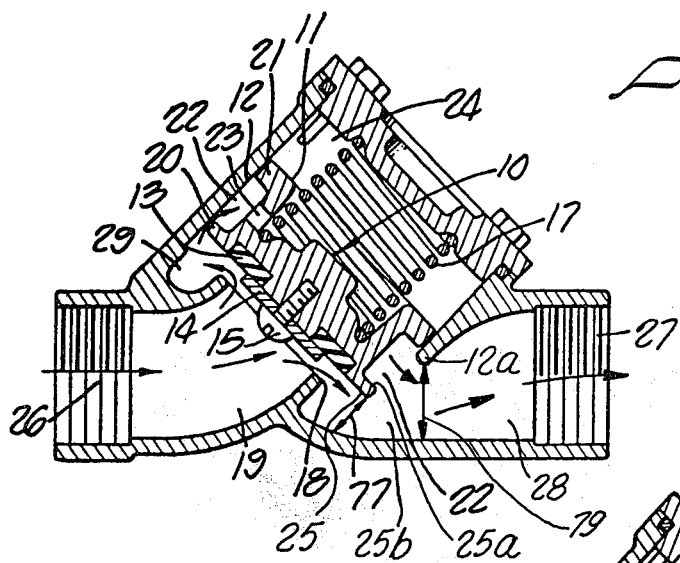
FIG. 4 is a sectional elevation showing a single check valve assembly, the valve assembly being shown in open position.

Referring to the drawings, the backflow preventer assembly shown in FIGS. 1 and 2 includes a double check valve assembly 33 having its inlet terminal 34 connected to a supply pipe 36 through a shutoff valve 37 and a union coupling 38. The outlet terminal 35 of the double check valve assembly 33 is connected through union coupling 39 and shutoff valve 40 to the service pipe 41. The check valve assembly shown in FIG. 4 and generally designated 10 includes a poppet 11 slidably mounted within a cylindrical surface in the stationary barrel 12. An annular resilient seal 13 serves as a valve face and is held in place on the poppet 11 by means of a retaining washer 14 and a threaded fastening 15. A coil compression spring 17 acts on the poppet 11 to bring the resilient ring 13 into sealing engagement with the stationary annular seat 18 provided at the end of the inlet passage 19.

The poppet 11 has a first flange 20 and a second flange 21 both slidably mounted within the stationary barrel 12. An annular groove 22 is defined between the flanges 20 and 21, and one or more ports 23 establish communication between the groove 22 and the spring chamber 24. The first flange 20 has a first annular surface 25 co-planar with the sealing surface of the seal ring 13 and extending radially outward therefrom. The flange 20 also has a second surface 25a on the other side of the flange which forms one side of groove 22. The wall portion 12a of the inclined barrel 12 extends into the discharge passage 28 so that when flow takes place the discharge pressure is not reflected into the spring chamber 24.

In FIG. 4, the inlet terminal 26 and the outlet terminal 27 are coaxial, and the axis of movement of the poppet 11 is positioned at about 45° with respect thereto. The parts are shown in open position. Fluid in the inlet 19 passes between the annular seat 18 and the resilient ring 13 into the outlet passage 28. Inlet pressure is then present in annular region 29 acting upon the total pressure area of the flange 20 to overcome the force of the spring 17. Thus, flange 20 effectively serves as a restriction seal between the pressure region 29 and the annular groove 22.

The outer diameters of the poppet flanges 20 and 21 are substantially larger than the effective diameter of the stationary seat 18, so that when the poppet valve 11 is in closed position with the resilient ring 13 engaging the seat 18, the pressure in the inlet passage 19 acts over a substantially smaller area than the pressure in the spring chamber 24. When the pressure in the inlet passage 19 applied across the area of seat 18 is sufficient to overcome the force of the spring 17 and the pressure in the spring chamber 24, both the static and the dynamic head are subsequently applied to the larger effective area of the flange 20. Thus, the increase in effective area when the poppet valve 11 first opens results in a substantial force to overcome the spring force, and the poppet 11 moves toward open position.

When the check valve parts are in open position corresponding to forward flow operation, as shown in FIG. 4, the flow of the fluid creates a low pressure region around the poppet 11 in the groove 22. This occurs because a portion of the flange 20 and a portion of the groove 22 extend into the region 25b. This reduced pressure is reflected into the spring chamber 24 through the groove 22 and through the port or ports 23, as well as through the clearance between the flange 21 and the barrel 12. Consequently, as the velocity of forward flow increases, the unit pressure in the chamber 17 decreases over the effective area defined by the diameter of flange 20.

When the pressure in the outlet passage 28 falls below a predetermined value, as compared to the pressure in the inlet passage 19, the portion of the poppet 11 which protrudes into the outlet passage 28 receives the full pressure of the liquid just prior to threatened reverse flow, and the force as thus developed acts over the full effective area of spring chamber 24, which combined with the force of the spring 17 acts to close the valve promptly.

It will be observed that, in the construction just described, as the velocity of forward flow increases, the velocity head produces a positive opening force on the poppet 11 on the side containing the resilient seal 13, together with a lowering of unit pressure in the chamber 24, both effects serving to oppose the force of the spring 17. Moreover, the lowering of pressure in the spring chamber 24 is developed due to the portion of the poppet flange 20 protruding into the outlet passage 28 and creating a restriction 77 in which the momentum of fluid flow acting upon the static fluid in groove 22 results in the lowering of pressure in groove 22 and transmitted to the spring chamber 24 through the communicating port 23. A second restriction 79 exists between the wall portion 12a of the barrel 12 and the interior surface of the outlet passage 28. Consequently, as the demand for flow increases, the resulting momentum increase results in an ever decreasing pressure in the spring chamber. Concurrently, as the rate of flow increases, the velocity head acting upon the full effective area of flange 20 (on the side with the resilient seal) increases. With both effects thus combined, a substantial pressure differential is created across the flange 20 to create an increasing force to overcome the force of the spring 17. Furthermore, even with the introduction of restriction 77 and a consequent "induced" pressure drop in the region 25b, the net result is an advantageous pressure differential across the poppet 11 and a reduction in the total pressure drop across the valve assembly. Moreover, the spaced flanges 20 and 21 guide the poppet in its movements within the barrel 12 with adequate clearances to avoid mechanical frictional losses and to minimize mechanical malfunctions. The absence of guide pins, toggle levers, etc., also assists in the reduction of mechanical friction.

Figure 3:
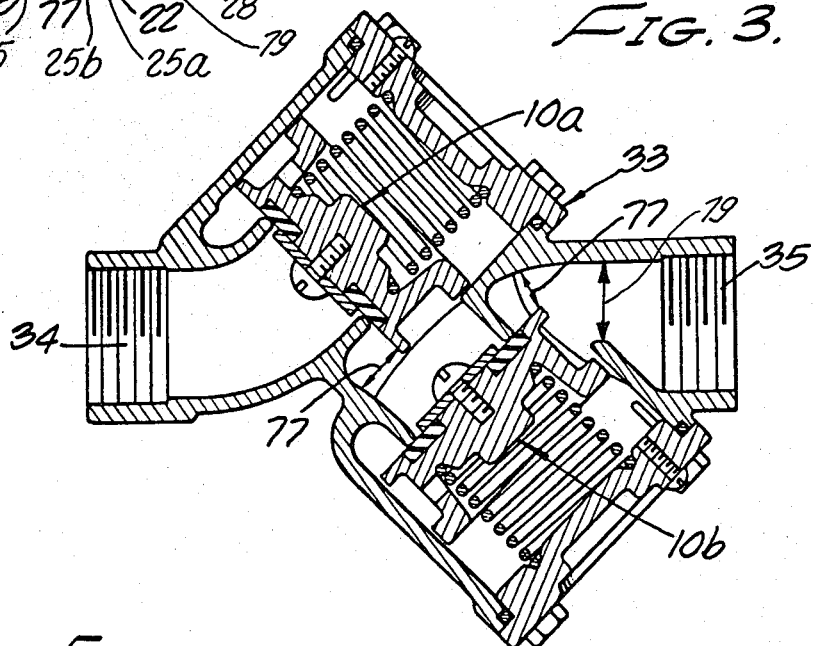
FIG. 3 is a sectional elevation of the double check valve assembly shown in FIGS. 1 and 2, both check valves being shown in closed position.

The double check valve assembly generally designated 33, shown in FIG. 3, employs two duplicate check valve assemblies 10a and 10b which are substantially the same as the check valve 10 described in detail above. These check valve assemblies are arranged at right angles, the check valve 10a assembly being positioned at 45° to the axis of the inlet terminal 34 and the check valve assembly 10b being at 45° to the axis of the outlet terminal 35. The construction and operation of each of these check valve assemblies 10a and 10b is the same as that of the check valve assembly 10 described above. Moreover, the geometric relationship of the assemblies 10a and 10b as shown in FIG. 3 produces a uniform flow pattern by minimizing the extent of the changes in direction of flow and the extent of obstructions to forward flow, thus minimizing fluid pressure losses.

Figure 5:
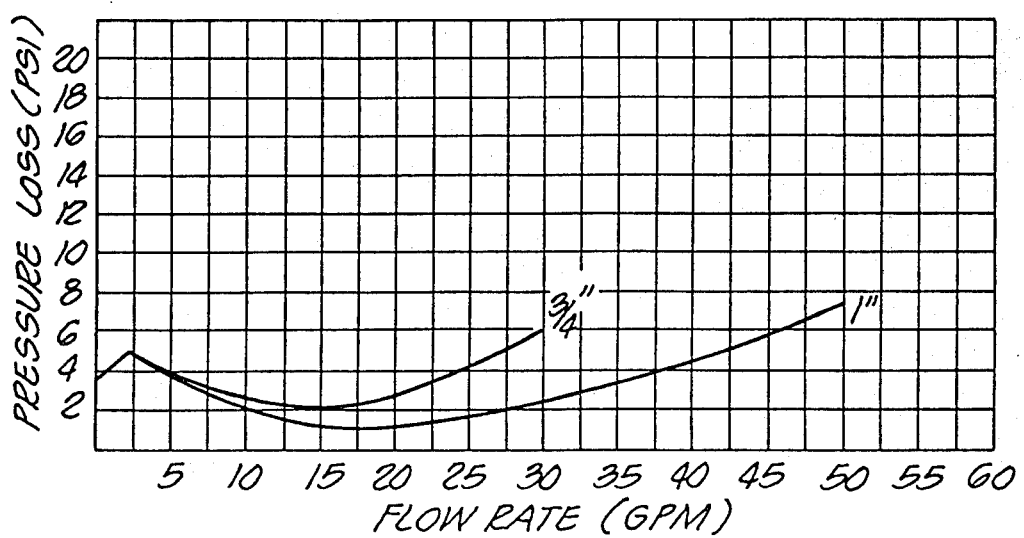
FIG. 5 is a graph showing pressure loss plotted against flow rate in a commercial form of the double check valve assembly shown in FIG. 3. One curve of the graph relates to a device of three-quarter inch nominal size, and another curve relates to a device of one inch nominal size.

The chart of FIG. 5 shows the pressure loss through the double check valve assembly of FIG. 3, for both the nominal size of three-quarter inch and the nominal size of one inch. It will be observed that the pressure loss through the assemblies 10a and 10b actually falls off as the flow rate increases, up to about 15 gallons per minute for the three-quarter inch size and up to about 18 gallons per minute for the one inch size. This pressure drop is so low that three inch nominal size double check valves embodying this invention are able to meet the standards for four inch nominal size check valves of conventional type, thereby producing an important competitive advantage.

It will be observed that the moving parts of each check valve assembly 10a and 10b may be installed and removed independently without any need to disconnect the entire assembly from the line. Moreover, each check valve assembly is so arranged as to utilize the full impact of the dynamic pressure in the supply line when in forward flow operation, for effectively minimizing hydraulic pressure losses. Furthermore, each check valve assembly is so arranged as to have portions of the poppet thereof protruding into its respective discharge passage, or in communication with its discharge passage, so as to be responsive to the slightest action toward reverse flow, closing spontaneously to prevent backflow.

The differential control valve 43 is responsive through line 45 to the pressure in the inlet 19, and is responsive through a pipe 44 to the zone 52 between the check valves 10a and 10b.

The chamber 52 is vented to atmosphere through pipe 44 and outlet 78 whenever the downstream pressure in the region of the terminal 35 approaches the upstream pressure in the region of the terminal 34 within a predetermined amount, for example, two pounds per square inch. The construction and operation of the control valve assembly 43 are described in detail in our copending application Ser. No. 10,934, filed Feb. 9, 1979 and entitled "Backflow Prevention Apparatus".

Having fully described our invention, it is to be understood that we are not to be limited to the details herein set forth but that our invention is of the full scope of the appended claims.

We claim:

1. In a double check valve assembly having two duplicate check valves connected in series, the upstream check valve having an inlet terminal and the downstream check valve having a discharge terminal, said terminals being axially aligned, and a passage constituting the discharge passage for the upstream check valve and the inlet passage for the downstream check valve, the improvement comprising, in combination: each check valve having a stationary annular valve seat, and having a stationary barrel positioned coaxially of said valve seat, each check valve having a valve poppet guided for axial movement in its respective barrel and having a seal element adapted for sealing contact with its respective valve seat, each check valve having a spring acting to move its respective valve poppet into sealing contact with said valve seat, each valve poppet having an axis of movement disposed at an angle of about 45° with respect to the axis of said coaxial terminals, and each valve poppet having an axis of movement at substantially right angles to the axis of movement of the other valve poppet.

2. In a double check valve assembly having two duplicate check valves connected in series, the upstream check valve having an inlet terminal and the downstream check valve having a discharge terminal, said terminals being axially aligned, and a passage constituting the discharge passage for the upstream check valve and the inlet passage for the downstream check valve, the improvement comprising, in combination: each check valve having a stationary valve seat, and having a stationary barrel positioned coaxially of said valve seat, each check valve having a valve poppet mounted for axial sliding movement in its respective barrel and having a seal element adapted for sealing contact with its respective valve seat, means cooperating with each barrel and its respective valve poppet to define a chamber remote from its respective valve seat, each check valve having a spring acting in cooperation with fluid pressure in its respective chamber to move its respective valve poppet into sealing contact with said valve seat, each valve poppet having an axis of movement disposed at an angle of about 45° with respect to the axis of the coaxial terminals, each valve poppet having an axis of movement at substantially right angles to the axis of movement of the other valve poppet, means on each valve poppet and its respective barrel for establishing a localized zone of relatively rapid flow and consequent reduced pressure when forward flow occurs through the check valve assembly, and means on each valve poppet for establishing communication between its localized zone and its respective closed chamber, so that forward flow of fluid through said double check valve assembly causes a reduction of pressure in each chamber, whereby pressure drop through said double check valve assembly initially falls with increasing flow.

* * * * *